(12) United States Patent
Lloyd

(10) Patent No.: US 7,684,881 B2
(45) Date of Patent: Mar. 23, 2010

(54) TRANSIENT-SENSITIVE INDICATORS FOR HMI DEVICES

(75) Inventor: Robert F. Lloyd, Muskego, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 231 days.

(21) Appl. No.: 11/536,070

(22) Filed: Sep. 28, 2006

(65) Prior Publication Data

US 2008/0189246 A1      Aug. 7, 2008

(51) Int. Cl.
*G05B 15/00* (2006.01)
*G06F 3/048* (2006.01)

(52) U.S. Cl. .......................................... 700/83; 715/771

(58) Field of Classification Search .................. 700/17, 700/83; 702/179, 182, 187, 188, 189, 199; 715/771, 772, 965, 970
See application file for complete search history.

(56) References Cited

U.S. PATENT DOCUMENTS

| | | | |
|---|---|---|---|
| 4,249,186 A * | 2/1981 | Edwards ..................... | 346/35 |
| 6,728,262 B1 | 4/2004 | Woram | |
| 6,834,209 B2 | 12/2004 | Potz et al. | |
| 6,904,387 B2 | 6/2005 | Melzer | |
| 7,200,580 B1 * | 4/2007 | Kovish et al. ................. | 706/12 |
| 2003/0028269 A1 * | 2/2003 | Spriggs et al. ............... | 700/83 |
| 2003/0105535 A1 | 6/2003 | Rammler | |
| 2005/0168891 A1 | 8/2005 | Nilman-Johansson et al. | |

* cited by examiner

*Primary Examiner*—Ryan A Jarrett
(74) *Attorney, Agent, or Firm*—Turocy & Watson LLP; Alexander R. Kuszewski

(57) ABSTRACT

The innovation disclosed provides a system and/or method that facilitates optimizing a human machine interface (HMI). An interface component can facilitate receipt of data associated with an industrial automation environment. A human machine interface (HMI) component can be communicatively coupled to the interface component to include a capture component that collects a portion of transient data associated with the industrial automation environment, wherein the portion of transient data is utilized by the human machine interface component.

21 Claims, 10 Drawing Sheets

TRANSIENT-SENSITIVE INDICATORS FOR HMI DEVICES

TECHNICAL FIELD

The subject invention relates to industrial control systems and, more particularly, to employing optimized human machine interfaces (HMIs) with enhanced capabilities.

BACKGROUND

Due to advances in computing technology, businesses today are able to operate more efficiently when compared to substantially similar businesses only a few years ago. For example, internal networking enables employees of a company to communicate instantaneously by email, quickly transfer data files to disparate employees, manipulate data files, share data relevant to a project to reduce duplications in work product, etc. Furthermore, advancements in technology have enabled factory applications to become partially or completely automated. For instance, operations that once required workers to put themselves proximate to heavy machinery and other various hazardous conditions can now be completed at a safe distance therefrom.

Further, imperfections associated with human action have been minimized through employment of highly precise machines. Many of these factory devices supply data related to manufacturing to databases or web services referencing databases that are accessible by system/process/project managers on a factory floor. For instance, sensors and associated software can detect a number of instances that a particular machine has completed an operation given a defined amount of time. Further, data from sensors can be delivered to a processing unit related to system alarms. Thus, a factory automation system can review collected data and automatically and/or semi-automatically schedule maintenance of a device, replacement of a device, and other various procedures that relate to automating a process.

To quickly and easily effectuate control of a system or process within industrial automation environments, equipment manufacturers typically create specialized human-machine interfaces (HMIs) that are employed by operators to deliver commands to industrial systems/processes and/or receive data from industrial systems/processes. In other words, HMIs provide an essential communication link between operators and automation devices, wherein such HMIs enable operators to, among other things, implement and control devices and receive feedback by monitoring device status and health during operation. Without these interfaces, high-level industrial automation would be difficult if not impossible to achieve.

Over time, HMIs have undergone several and drastic changes. For instance, a push-button that commissions and de-commissions a machine is a simplest form of a HMI, and these interfaces have been existent for several years. Terminals were later designed that displayed text messages to end users, wherein such messages are indicative of a process performed by a server or processor associated with an automation device. For example, a failed device can generate an internal error code representing a determined error which can then be matched with a particular error message. This message can thereafter be displayed to an operator on a display device. Development of client-side processing has enabled graphical depictions of status and control commands to operators, which has shifted a burden from an automated device or associated processor to a client-side graphical user interface.

These graphical user interfaces can improve the ability of users to access information quickly and easily. However, traditional HMIs are limited in the rate at which data associated with an environment can be displayed. For instance, conventional HMI systems typically present information to a user and/or operator with an instantaneous snapshot of data and respective state of the system and/or environment. Therefore, data present in between the periods of such snapshots is not detected, presented, and/or provided to the user and/or operator. By not collecting this data within the snapshot, a tremendous amount of data and opportunities are lost.

SUMMARY

The following presents a simplified summary of the claimed subject matter in order to provide a basic understanding of some aspects described herein. This summary is not an extensive overview, and is not intended to identify key/critical elements or to delineate the scope of the claimed subject matter. Its sole purpose is to present some concepts in a simplified form as a prelude to the more detailed description that is presented later.

The subject innovation relates to systems and/or methods that facilitate employing a human machine interface (HMI) component to collect and utilize transient data associated with an environment. An HMI component can include a capture component that collects transient data related to an industrial automation environment. The capture component can implement transient capture logic that can record a range of data states that are associated with data received via an interface. Based on this collected range of data states, the HMI component and incorporated capture component can utilize and/or display an aggregation of data states associated with the industrial automation environment rather than a simple snapshot of a single state associated with the industrial automation environment.

In accordance with an aspect of the claimed subject matter, the HMI component can further utilize a filter component that can filter and/or format the transient data in any suitable format and/or manner for implementation with the HMI component. The filter component can employ a high filter, a low filter, an exponential high filter, a low tripping filter, an average, a mean average, a selective average, a user-defined mathematical operation, a mode, a median, etc. Moreover, upon filtering and/or formatting such transient data, the HMI component and incorporated capture component can display and/or utilize such data.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

DETAILED DESCRIPTION

Figure 1:
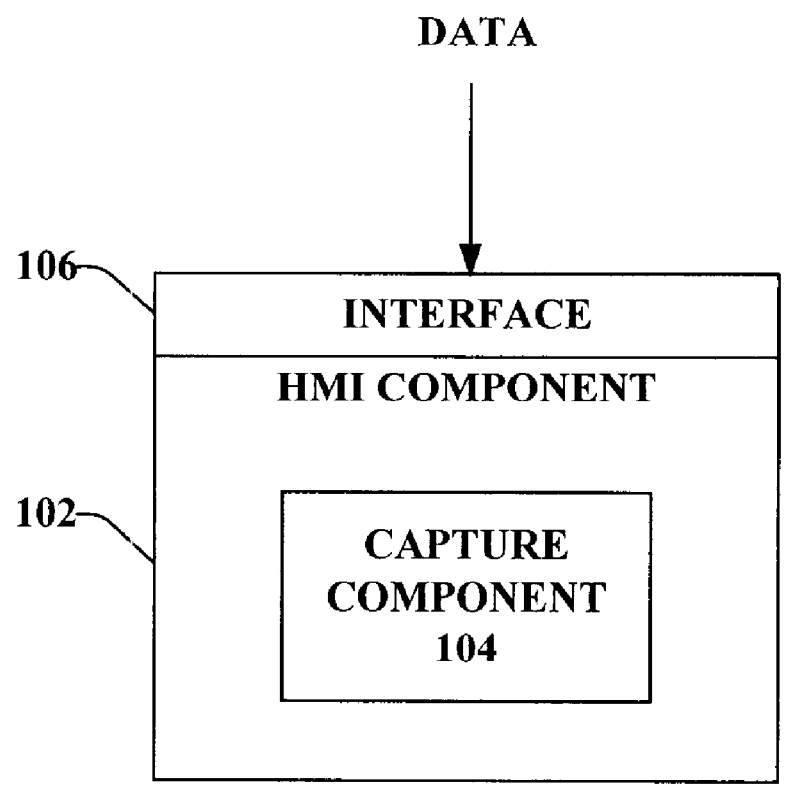
FIG. 1 illustrates a block diagram of an exemplary system that facilitates employing a human machine interface (HMI) component to collect and utilize transient data associated with an environment.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such matter can be practiced without these specific details. In other instances, well-known structures and devices are shown in block diagram form in order to facilitate describing the invention.

As used in this application, the terms "component" and "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Turning now to the drawings, FIG. 1 illustrates a system 100 that facilitates employing a human machine interface (HMI) component to collect and utilize transient data associated with an environment. The system 100 includes a human machine interface (HMI) component 102 with a capture component 104 that is incorporated therewith that can collect data received via an interface component 106 (also referred to as the interface 106 and discussed infra), wherein the data can be associated with an environment. The capture component 104 can implement transient capture logic that can record a range of data states that are associated with the received data. Based on this collected range of data states, the HMI component 102 and incorporated capture component 104 can display an aggregation of data states associated with the environment rather than a simple snapshot of a single state associated with the environment. It is to be appreciated that the data can be any data related to an environment such as, but not limited to, real-time data, analog data, digital data, an event associated with the environment, data related to a programmable logic controller (PLC), data associated with an application, any suitable data having a state associated therewith, any suitable data that can be displayed on a display and/or a human machine interface (HMI), etc. It is also to be appreciated and understood that the HMI component 102 can be any suitable device that can present information and/or data.

For instance, the data displayed with the HMI component 102 can be dictated by a periodic cycle of snapshots based on data being received at a faster rate than display capabilities. Such snapshots can expose particular data at a specific instance and/or state. In general, conventional HMIs can only display data based on such snapshots and data in between such snapshots is not displayed and/or utilized. Thus, this transient data can be collected by the capture component 104 and utilized by the HMI component 102 to allow the display of a plurality of data states associated to an environment rather than a single data state. In other words, the capture component 104 can collect data in between the periodic cycle of snapshots to allow the HMI component 102 utilize and/or display such data in a particular manner and/or format (discussed infra).

Furthermore, such transient data can be utilized by the HMI component 102, a device within the HMI component 102, an automation device (e.g., a physical device), a programmable logic controller, a user, an operator, etc. For instance, the device 104 within the HMI component 102 can be, but is not limited to, a light emitting diode (LED), a dial, an analog control, a bar graph, a graph, a push button, a gauge, a visual indicator, a slider, a light indicator, a numeric read out, a read out, a numeric input, an input, a graphical icon, any suitable device associated with an HMI that can provide user interaction, and any suitable device associated with an HMI that can provide data.

Moreover, the system 100 can include any suitable and/or necessary interface component 106 (referred to herein as interface 106), which provides various adapters, connectors, channels, communication paths, etc. to integrate the HMI component 102 into virtually any operating and/or database system(s). In addition, the interface component 106 can provide various adapters, connectors, channels, communication paths, etc., that provide for interaction with the HMI component 102.

Figure 2:
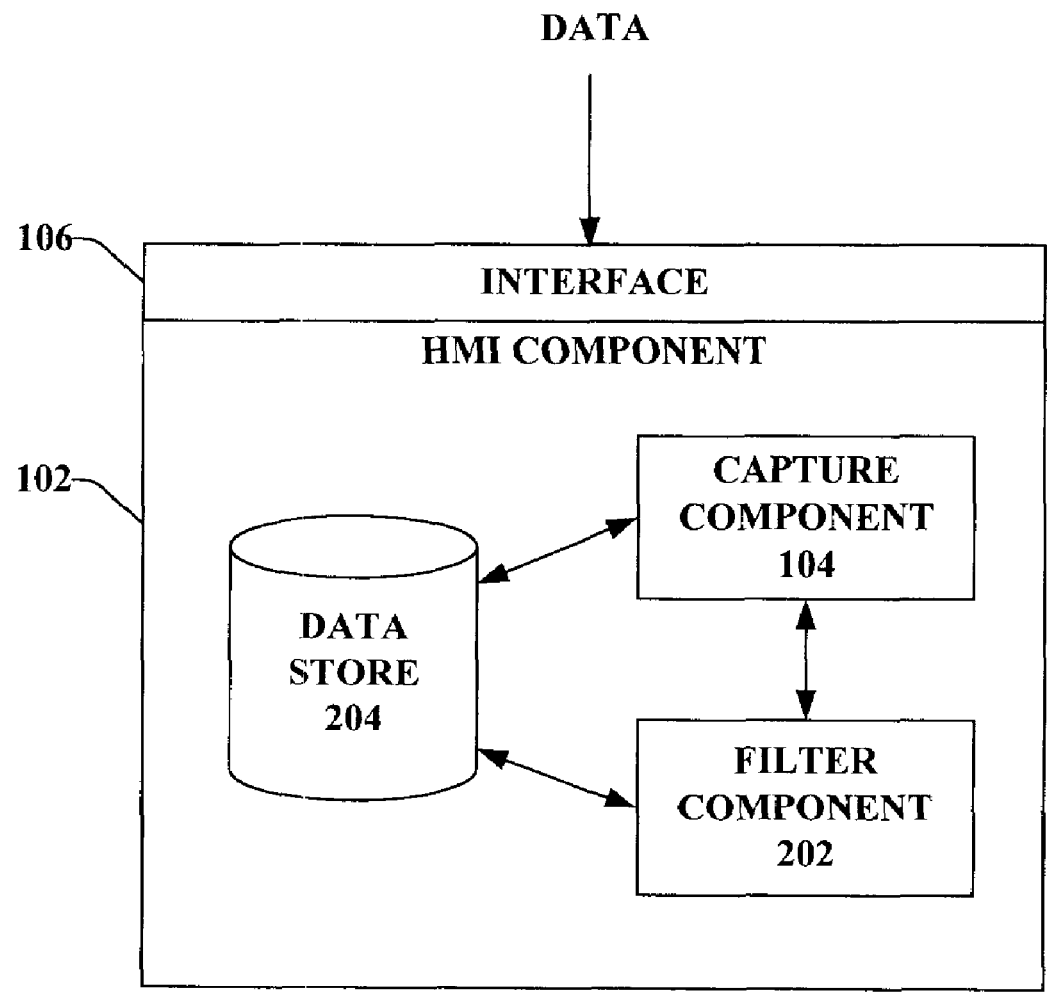
FIG. 2 illustrates a block diagram of an exemplary system that facilitates collecting transient data by integrating logic into a human machine interface (HMI) component.

FIG. 2 illustrates a system 200 that facilitates collecting transient data by integrating logic into a human machine interface (HMI) component. The system 200 can include the HMI component 102 with the integrated capture component 104 that can collect data and respective data states that are in between snapshots utilized to display data. In particular, the data not captured with a snapshot (e.g., data in between snapshot cycles) can be referred to as transient data. Thus, the capture component 104 can collect transient data, wherein the HMI component 102 can utilize such transient data related to the environment. The capture component 104 can collect and/or record a range of data and respective states via the interface 106 such that the system 100 can utilize and/or display such transient data and/or range of data.

The capture component 104 can include logic to allow the collection of data associated with an environment. In particular, this collection can include data typically not captured due to being within HMI data snapshots (e.g., such snapshots allow the HMI to display data at an instantaneous point). The capture component 104 can collect data (e.g., at snapshots and in between snapshots) to allow a filter and/or format to be implemented before the HMI component 102 utilizes and/or displays such transient data (e.g., collected data at snapshots and in between snapshots).

The HMI component 102 can further include a filter component 202 that can manipulate and/or format the data received via the interface 106. Specifically, the data received can be stored within a data store 204 (discussed in detail infra), wherein the filter component 202 can apply any suitable format and/or filter thereupon to allow employment of such data. In other words, the data store 204 can store data associated with the environment, yet the filter component 202 can selectively aggregate such data for use. For instance, the filter component 202 can use any suitable filter and/or format technique such as, but not limited to, a high filter, a low filter, an exponential high filter, a low tripping filter, an average, a mean average, a selective average, a user-defined mathematical operation, a mode, a range midpoint filter, a median, etc. Upon such formatting and/or filtering, the HMI component 102 can utilize and/or display such transient data.

For instance, a system can receive data related to a heartbeat within an industrial automation environment. The data to display can be received every second via a snapshot, wherein an LED associated with an HMI can blink accordingly (e.g., brightness can indicate strength of the heartbeat). The capture component 104 can utilize internal logic to capture transient data associated with the heartbeat (e.g., data between the second intervals), wherein such transient data can be filtered and/or formatted. In particular, the transient data can be averaged such that the average value can be displayed with the LED (e.g., with correlating strength corresponding to brightness) rather than a snapshot of data at that particular second interval. In other words, the LED can display the range of data and data states associated with the heartbeat rather than a snapshot of data and data state at one particular instance.

Following the example above, the LED can have a low, dim, and high output. If the heartbeat strength during a cycle was snapshot at a high output, this high output would be displayed. However, in between the snapshots, data was not collected and not taken into account for such display. The system 200 can allow such transient data to be utilized and/or displayed. For a snapshot cycle of 3 iterations, the LED can display the value for the heartbeat at three particular instances (e.g., low, low, and low). However, the real stream of data can be low for two-thirds of the iterations and high for the last third of the last iteration. Thus, the transient data can be displayed utilizing the average filter and/or format which will enable the LED to display a low, low, and dim output. The following fourth iteration would then be a low value for the LED display because the transient data was low throughout the entire cycle.

Moreover, the system 200 can include the data store 204 that can store transient data, data capture settings, data related to the environment, user profiles, configuration of data display, HMI settings, configurations associated with an entity that utilizes transient data (e.g., HMI devices, a PLC, a physical device, etc.), filter criteria, display data, etc. The data store 204 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 204 of the subject systems and methods is intended to comprise, without being limited to, these and any other suitable types of memory. In addition, it is to be appreciated that the data store 204 can be a server, a database, a hard drive, and the like.

Figure 3:
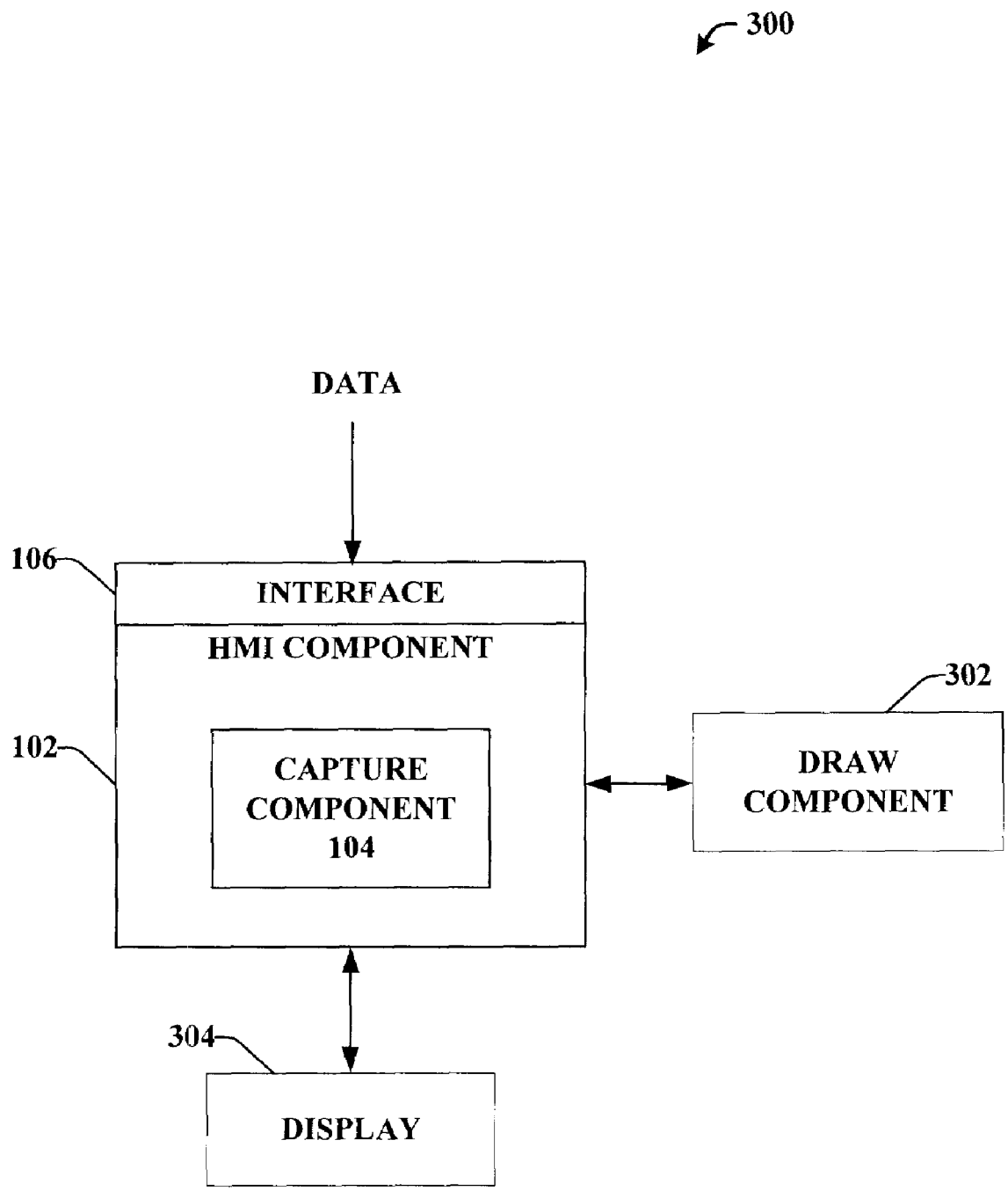
FIG. 3 illustrates a block diagram of an exemplary system that facilitates accumulating data between snapshots of an environment for display.

FIG. 3 illustrates a system 300 that facilitates accumulating data between snapshots of an environment for display. The HMI component 102 can include the capture component 104 that employs logic to capture transient data (e.g., data and corresponding states related to in between snapshot instances), wherein such transient data can be formatted and/or filtered for implementation and/or display with the HMI component 102. For instance, a range of data and corresponding data states can be accumulated by the capture component 104, wherein the average of such collected data can be displayed and/or utilized at the snapshot interval rather than the actual snapshot of the data.

The system 300 can further include a draw component 302 that can initiate a data capture via a snapshot. The draw component 302 can dictate a snapshot cycle and frequency associated therewith. Thus, if the draw component 302 initiates a draw every five seconds, the HMI component 102 would receive and utilize a snapshot of data related to the environment at these times. However, the capture component 104 employs transient capture logic that can record and/or collect a range of data and data states in between such snapshots to allow such data to be displayed (e.g., with filtering and/or formatting) on a display 304. The display component 404 can be, but is not limited to, a computer monitor, a television, a plasma screen, a touch-screen, a portable digital assistant (PDA), an LCD, a mobile communication device, a messenger device, a flat-screen, a smartphone, a laptop, a machine, a cellular phone, and/or any suitable device utilized to display data to a user and/or machine. It is to be appreciated that the transient filtered data may not match the current output and that the display of transient-filtered data can trigger another draw cycle. This can be implemented for data driven systems, for instance, to ensure that a transient spike followed by a stable state does not cause the transient data to stick and/or stay on the display.

Figure 4:
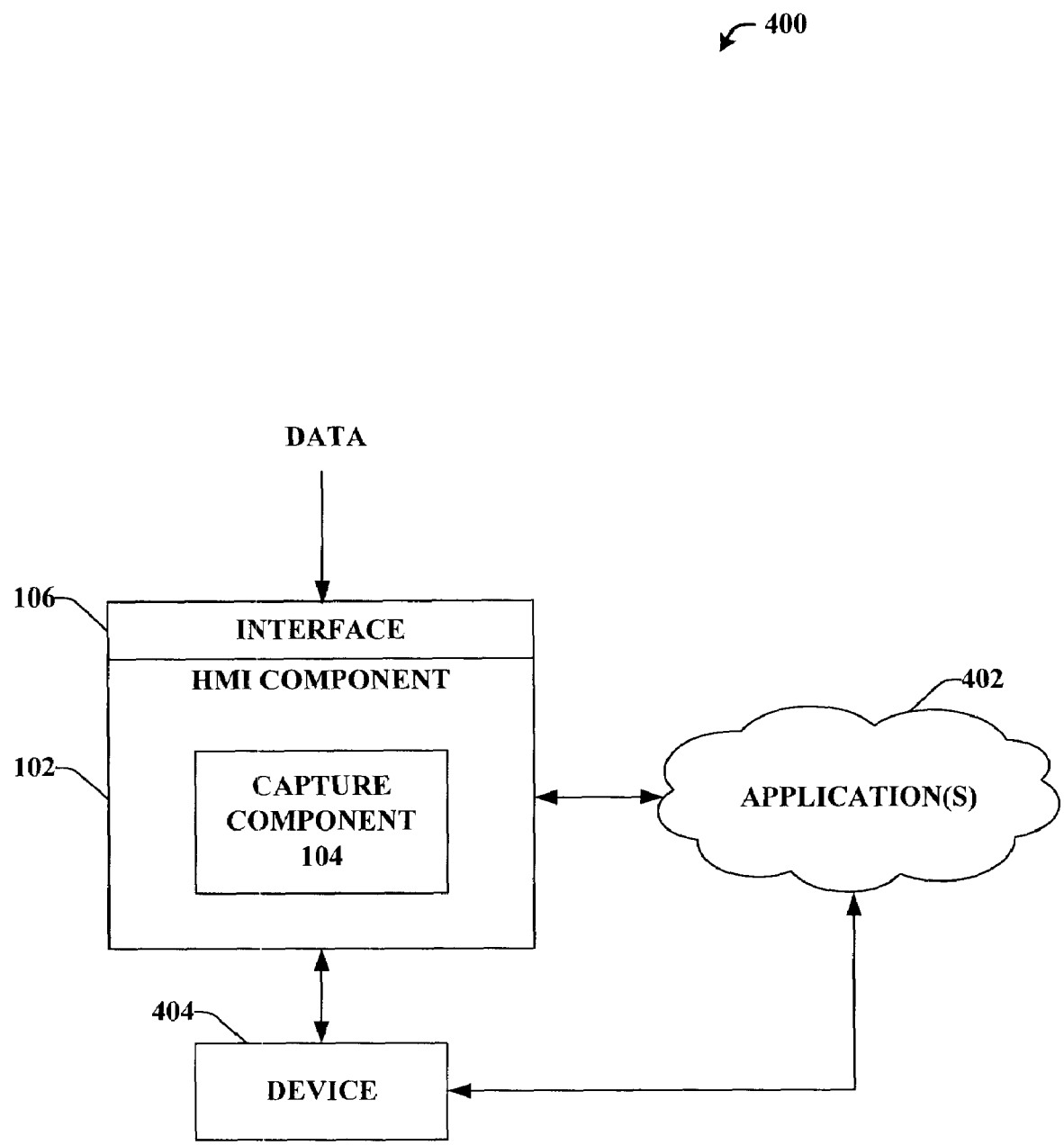
FIG. 4 illustrates a block diagram of an exemplary system that facilitates utilizing a human machine interface (HMI) component and integrated logic to capture transient data within an environment.

FIG. 4 illustrates a system 400 that facilitates utilizing a human machine interface (HMI) component and integrated logic to capture transient data within an environment. The transient data accumulated by the logic associated with the capture component 104 can be utilized by any suitable entity within the system 400 such as, but not limited to, an application 402, a physical device 404, a PLC, a portion of software, a disparate HMI, a disparate system, a portion of code, a program, a routine, a task, a component, a portion of code utilized by a controller, a module, an I/O module, a network, a drive, a motion axis, a drive, a trend, a structure, a tag, an object, a modular controller component, and/or any suitable entity that can be utilized within an automation environment.

Furthermore, the HMI component 102 can provide control and/or data display related to, for example, a physical device 404 within an industrial automation environment. The physical device 404 can be, but is not limited to, a computer, a disparate controller, a roller, a station, a welder, a scanner, a belt conveyor, a conveyor, a pump, a press, a fan, a furnace, a cooler, a valve, an electrical component, a drain, a photo eye, etc., or any other suitable device that can be associated with data that can be collected within an automation. In addition, it is to be understood that the HMI component 102 can provide control and/or data display for a plurality of physical devices within an automated industrial environment and the claimed subject matter is not so limited. Moreover, such physical device 404 can be represented by a device within the HMI component 102 such as, but not limited to, a light emitting diode (LED), a dial, an analog control, a bar graph, a graph, a push button, a gauge, a visual indicator, a slider, a light indicator, a numeric read out, a read out, a numeric input, an input, a graphical icon, any suitable device associated with an HMI that can provide user interaction, and any suitable device associated with an HMI that can provide data.

Figure 5:
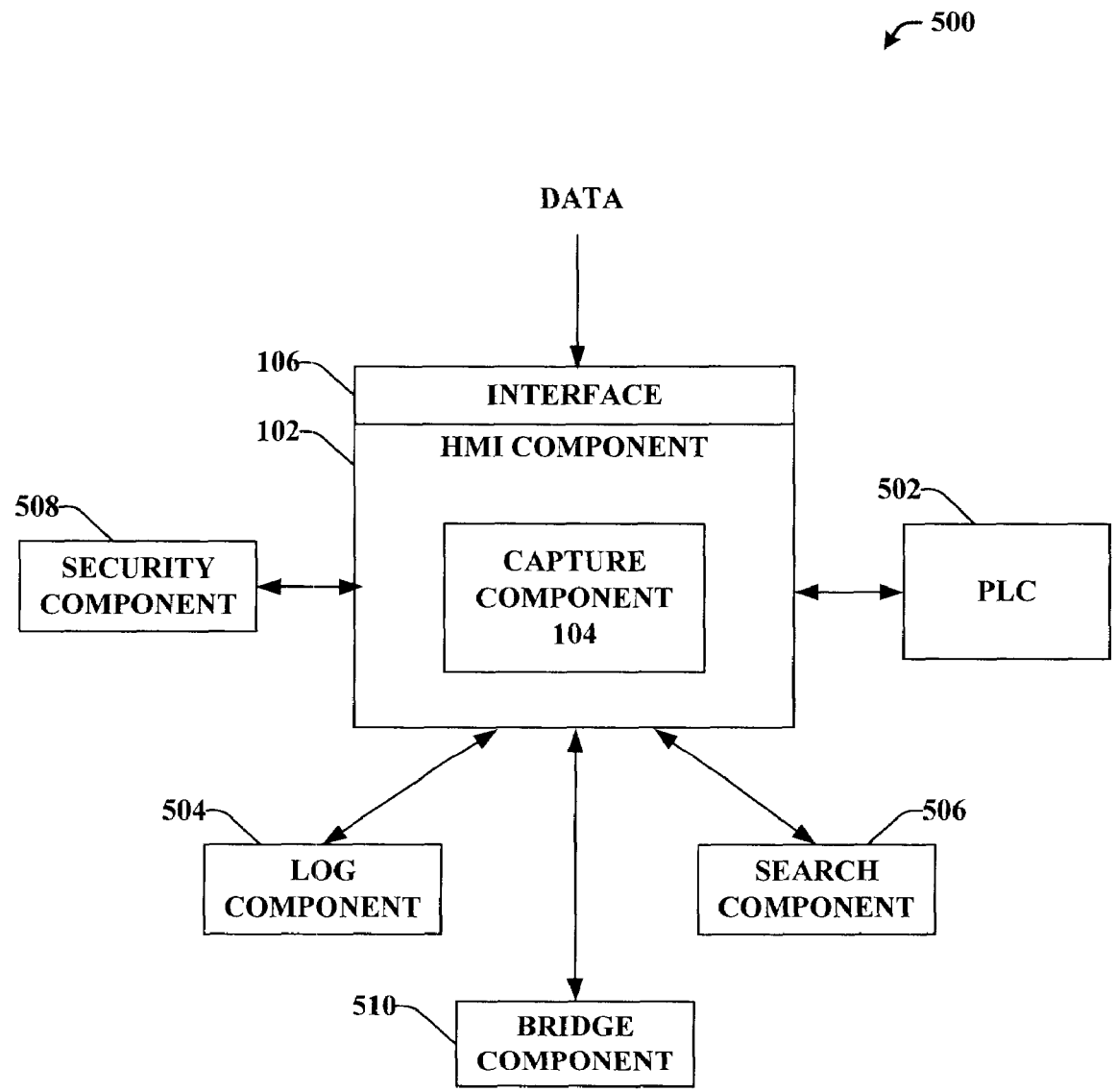
FIG. 5 illustrates a block diagram of an exemplary system that facilitates integrating transient data collect within a human machine interface (HMI) component.

FIG. 5 illustrates a system 500 that facilitates integrating transient data collect within a human machine interface (HMI) component. The HMI component 102 can integrate a capture component 104 that can utilize accumulated transient data associated with an environment, wherein the transient data relates to data and respective data state in between a data snapshot of the environment for display. In other words, the capture component 104 can record data states within the environment between snapshots and allow the HMI component 102 to utilize such recorded data (e.g., filtered, averaged, etc.) to display rather than the snapshot data. It is to be appreciated that the transient data can relate to any suitable data associated with an environment, an industrial automation environment, a PLC, an HMI, a data state, etc.

The HMI component 102 can utilize a log component 504 that tracks data associated with a PLC 502 and/or the system 500. It is to be appreciated that log component 504 can be a stand-alone component, incorporated into the HMI component 102, and/or any combination thereof. For example, the system 500 can include a substantial amount of data, wherein the HMI component 102 and the capture component 104 display a filtered (e.g., averaged, mean, maximum value, etc.) portion of such data (e.g., transient data). However, the log component 504 can track such data within the system 500 to allow disparate users, components, systems, PLC's, entities, computers, machines, and the like to utilize such tracked data. Moreover, the log component 504 can track the particular filter (if any) utilized on which data during a specific time. Thus, if an averaging technique was employed on data relating to an alignment point sensor on Sep. 21, 2006, such data can be stored with the log component 504. In addition, the log component 506 can store the logged entries in a data store (not shown).

The HMI component 102 can further implement a search component 506 that facilitates querying any data associated with the system 500. The search component 506 allows a user and/or any component to query to system 500 in relation to transient data, data displayed, collected data, filter settings, etc. For instance, a user can query the system 500 utilizing the search component 506 to find transient data collected related to a spray device utilized by a particular PLC. In another example, the search component 506 can allow a developer to provide all transient data associated with devices within sector 5, cell 6, and controlled by controller A. It is to be appreciated that a plurality of searches and/or queries can be implemented by the search component 506 and the above examples are not to be limiting on the claimed subject matter. Moreover, it is to be appreciated that the search component 506 is depicted as a stand-alone component, but the search component 506 can be incorporated into the HMI component 102, a stand-alone component, and/or any combination thereof.

The HMI component 102 can further utilize a security component 508 that provides security to the system 500 to ensure data integrity. In particular, the security component 508 can define security, authorization, and/or privileges in accordance with at least one of a pre-defined hierarchy, security level, username, password, access rights, data importance (e.g., more important data correlates with high security clearance), etc. For instance, a particular portion of transient data can be a first security level with distinct security authorizations and/or privileges, while a disparate portion of transient data can have a second security level with disparate security authorizations and/or privileges. Thus, the security component 508 can provide granular security in relation to transient data, transient data relationship, transient data ownership, transient data location, etc. It is to be appreciated that there can be various levels of security with numerous characteristics associated with each level and that the subject innovation is not limited to the above example. Moreover, the security component 508 provides granular security and/or privileges to the system 500. It is to be appreciated that security component 508 can be a stand-alone component, incorporated into the HMI component 508, and/or any combination thereof.

The HMI component 102 can further include a bridge component 510 that facilitates networking within an industrial automation environment. In other words, the bridge component 510 can act as a network bridge. Thus, data carried by disparate networks can be manipulated so that it conforms to a common network. Accordingly, the bridge component 512 can recognize a network protocol associated with received instructions related to the PLC 502 and perform operations to convert such data so that it conforms to a pre-defined protocol. Upon such conversion, a mapping can be employed to convert the data so that it conforms to a hierarchically structured data model (rather than data models associated with flat namespaces). The mapping can thereafter provide hierarchically structured data to a requester of such data over a network, wherein the network conforms to the pre-defined protocol. For instance, the first network protocol can be at least one of Fieldbus, Profibus, Hart, Modbus, ASI-bus, and Foundation Fieldbus, while the second network protocol can be a Common Industrial Protocol (CIP).

Figure 6:
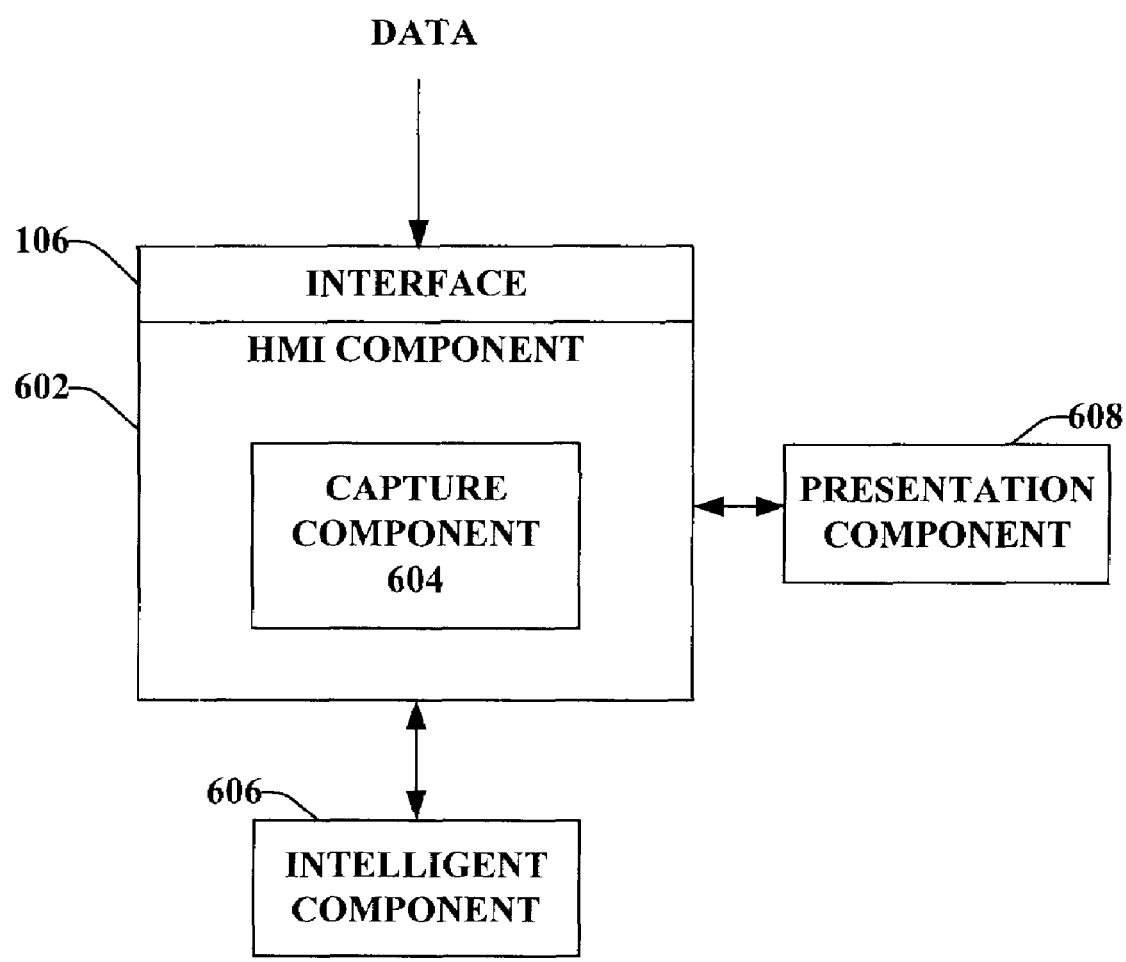
FIG. 6 illustrates a block diagram of an exemplary system that facilitates collecting transient data by integrating logic into a human machine interface (HMI) component.

FIG. 6 illustrates a system 600 that employs intelligence to facilitate collecting transient data by integrating logic into a human machine interface (HMI) component. The system 600 can include a human machine interface (HMI) component 602, a capture component 604 integrated therewith, and the interface 106 that can all be substantially similar to respective components and interfaces described in previous figures. The system 600 further includes an intelligent component 606. The intelligent component 606 can be utilized by the HMI component 602 to facilitate displaying transient data associated with an environment utilizing internal logic associated with the capture component 104 that is integrated within the HMI component 102. For example, the intelligent component 606 can infer transient data capture, snapshot cycles, collection of data between snapshot cycles, filter configurations, types of filters, display settings, user profiles, user settings, HMI component 102 settings, transient data implementation, etc.

Moreover, the intelligent component 606 can facilitate utilizing a consumption of a material and the status of such material to an operator role and/or position. For example, the intelligent component 606 can infer the consumption of raw materials utilized in the production of a particular industrial automation process and/or system. Such inference can be based at least in part upon historic data related to the consumption of materials, status and/or supply of materials, etc. Moreover, such consumption and status of materials can be communicated to an operator and/or the role of an operator.

It is to be understood that the intelligent component 606 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

A presentation component 608 can provide various types of user interfaces to facilitate interaction between a user and any component coupled to the HMI component 602. As depicted, the presentation component 608 is a separate entity that can be utilized with the HMI component 602. However, it is to be appreciated that the presentation component 608 and/or similar view components can be incorporated into the HMI component 602 and/or a stand-alone unit. The presentation component 608 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled to the HMI component 602.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 7:
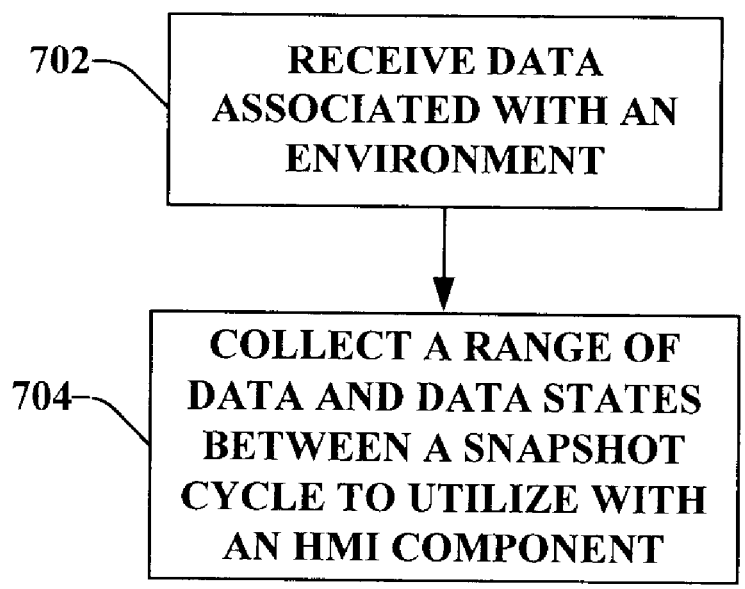
FIG. 7 illustrates an exemplary methodology for employing a human machine interface (HMI) component to collect and utilize transient data associated with an environment.
Figure 8:
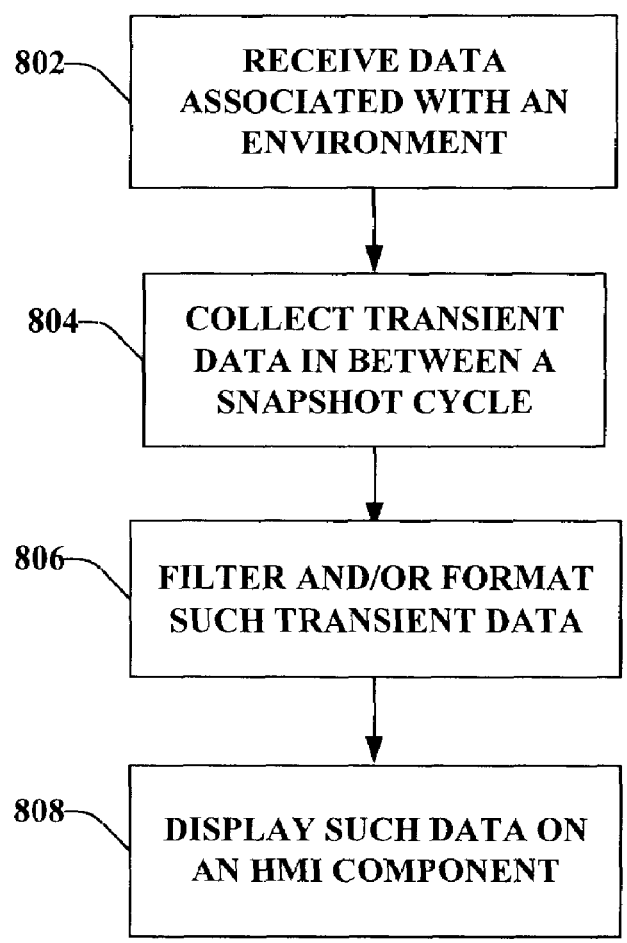
FIG. 8 illustrates an exemplary methodology that facilitates accumulating data between snapshots of an environment for display.

Referring to FIGS. 7-8, methodologies in accordance with various aspects of the claimed subject matter are illustrated. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 7 illustrates a methodology 700 for employing a human machine interface (HMI) component to collect and utilize transient data associated with an environment. At reference numeral 702, data associated with an environment can be received. It is to be appreciated that the data can be any data related to an environment such as, but not limited to, real-time data, analog data, digital data, an event associated with the environment, data related to a programmable logic controller (PLC), data associated with an application, any suitable data having a state associated therewith, any suitable data that can be displayed on a display and/or a human machine interface (HMI), etc. For instance, the data received can be represented by a device associated with a human machine interface (HMI) component, wherein the device can be, but is not limited to, a light emitting diode (LED), a dial, an analog control, a bar graph, a graph, a push button, a gauge, a visual indicator, a slider, a light indicator, a numeric read out, a read out, a numeric input, an input, a graphical icon, any suitable device associated with an HMI that can provide user interaction, and any suitable device associated with an HMI that can provide data.

At reference numeral 704, a range of data and data states can be collected between snapshots to enable the utilization of such range with an HMI component. A portion of transient capture logic can accumulate a range of data and data states between two or more data snapshots that occur at two or more specific instances. Thus, such range of data captured between the snapshots can be utilized and/or displayed to a user, operator, entity, machine, computer, etc. Furthermore, such collected transient data can be utilized by any suitable entity related to the environment such as, but not limited to, a PLC, a physical device, an application, a portion of software, a disparate HMI, a disparate system, a portion of code, a program, a routine, a task, a component, a portion of code utilized by a controller, a module, an I/O module, a network, a drive, a motion axis, a drive, a trend, a structure, a tag, an object, a modular controller component, and/or any suitable entity that can be utilized within an automation environment.

FIG. 8 illustrates a methodology 800 that facilitates accumulating data between snapshots of an environment for display. At reference numeral 802, data associated with an environment can be received. The data received can relate to any suitable parameter that can be measured and/or have a respective output for display (e.g., pressure, weight, on, off, idle, temperature, height, location, size, etc.). At reference numeral 804, transient data can be collected in between a snapshot cycle. Such snapshot can be a particular instant in time, yet is not continuous. Thus, data in between snapshots can be collected and referred to as transient data.

At reference numeral 806, the transient data can be filtered and/or formatting, wherein any suitable format and/or filter can allow employment of such data. For instance, the filter and/or format technique can be, but not limited to, a high filter, a low filter, an exponential high filter, a low tripping filter, an average, a mean average, a selective average, etc. At reference numeral 808, the filtered and/or formatted data can be displayed on an HMI component. Thus, the HMI component can display transient data associated with a range of data and respective data states rather than an instantaneous snapshot of data states within an environment.

For instance, data related to a heartbeat within an industrial automation environment can be received. The data to display can be received every second via a snapshot, wherein an LED associated with an HMI can blink accordingly (e.g., brightness can indicate strength of the heartbeat). The internal logic can capture transient data associated with the heartbeat (e.g., data between the second intervals), wherein such transient data can be filtered and/or formatted. In particular, the transient data can be averaged such that the average value can be displayed with the LED (e.g., with correlating strength corresponding to brightness) rather than a snapshot of data at that particular second interval. In other words, the LED can display the range of data and data states associated with the heartbeat rather than a snapshot of data and data state at one particular instance.

Figure 9:
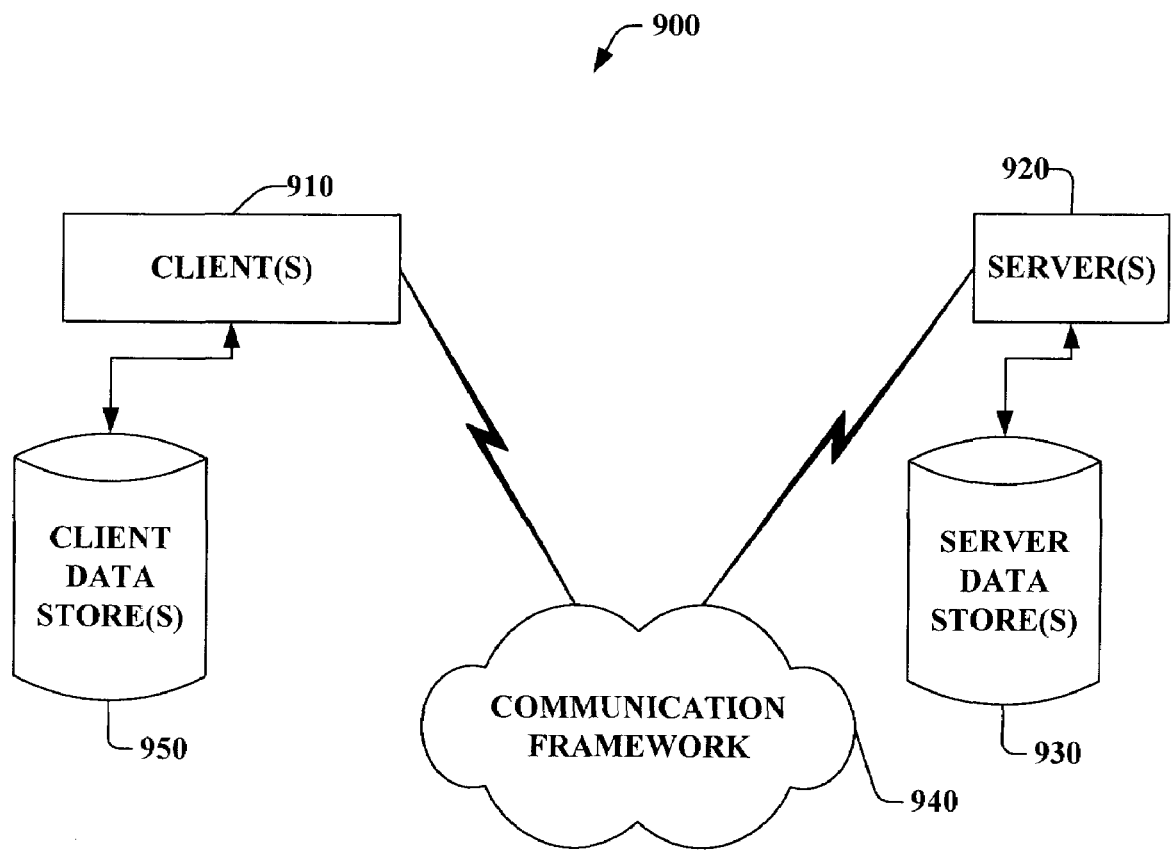
FIG. 9 illustrates an exemplary networking environment, wherein the novel aspects of the claimed subject matter can be employed.
Figure 10:
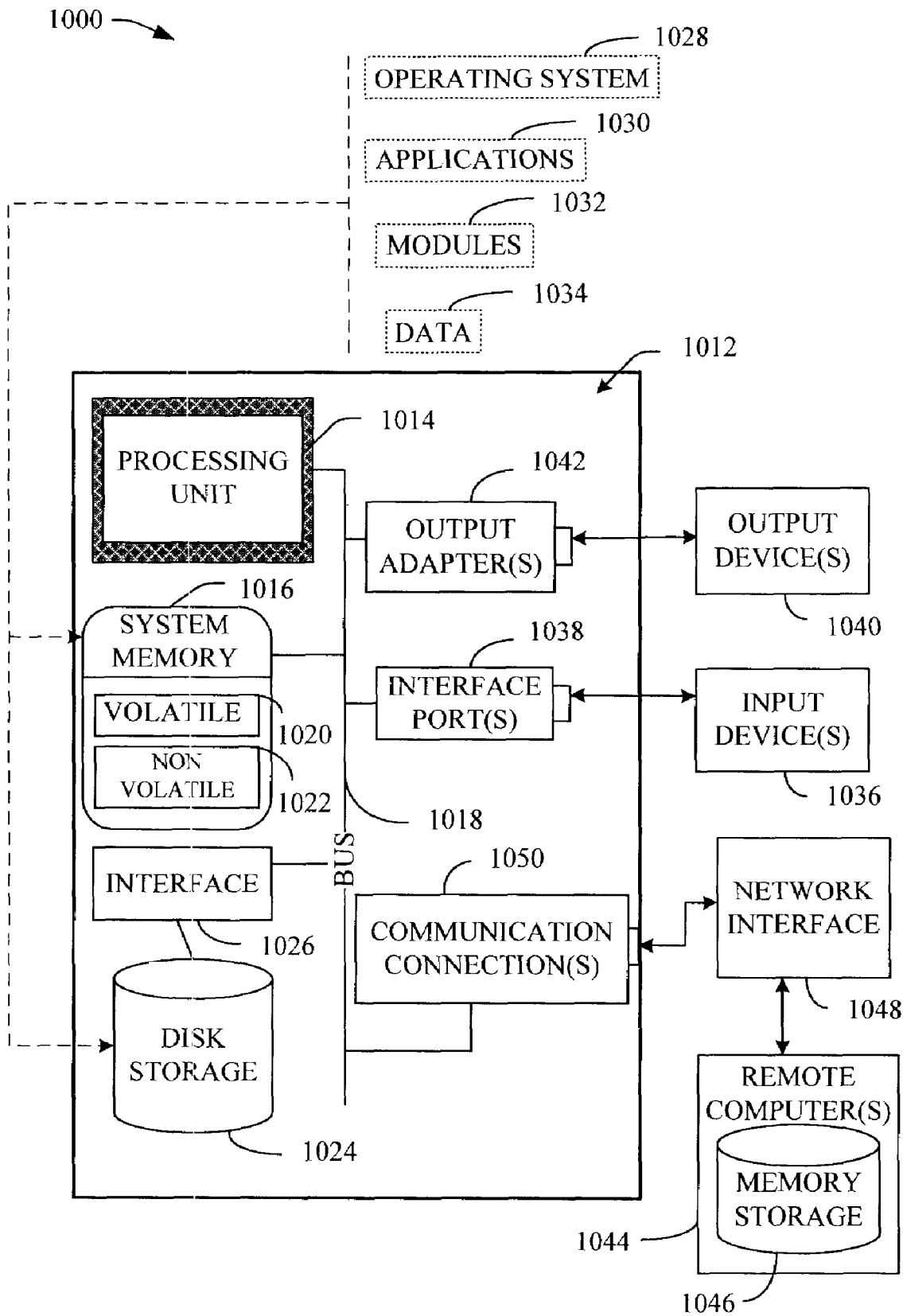
FIG. 10 illustrates an exemplary operating environment that can be employed in accordance with the claimed subject matter.

In order to provide additional context for implementing various aspects of the claimed subject matter, FIGS. 9-10 and the following discussion is intended to provide a brief, general description of a suitable computing environment in which the various aspects of the subject innovation may be implemented. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 9 is a schematic block diagram of a sample-computing environment 900 with which the claimed subject matter can interact. The system 900 includes one or more client(s) 910. The client(s) 910 can be hardware and/or software (e.g., threads, processes, computing devices). The system 900 also includes one or more server(s) 920. The server(s) 920 can be hardware and/or software (e.g., threads, processes, computing devices). The servers 920 can house threads to perform transformations by employing the subject innovation, for example.

One possible communication between a client 910 and a server 920 can be in the form of a data packet adapted to be transmitted between two or more computer processes. The system 900 includes a communication framework 940 that can be employed to facilitate communications between the client(s) 910 and the server(s) 920. The client(s) 910 are operably connected to one or more client data store(s) 950 that can be employed to store information local to the client(s) 910. Similarly, the server(s) 920 are operably connected to one or more server data store(s) 930 that can be employed to store information local to the servers 920.

With reference to FIG. 10, an exemplary environment 1000 for implementing various aspects of the claimed subject matter includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), or flash memory. Volatile memory 1020 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in the suitable operating environment 1000. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the claimed subject matter can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that facilitates utilizing a human machine interface (HMI), comprising:
at least one processor that executes the following computer executable components stored on computer readable medium:
an interface component that facilitates receipt of data associated with an industrial automation environment; and
a human machine interface (HMI) component communicatively coupled to the interface component that includes a capture component to collect a portion of transient data associated with the industrial automation environment, the portion of transient data is utilized by the human machine interface component, the transient data corresponds to data and respective data states collected in between a first snapshot and a second snapshot, each snapshot provides a single state of data within the industrial environment at one particular instance in time, the second snapshot comprises an aggregate of the portion of transient data, the aggregate comprises an average of the portion of the transient data.

2. The system of claim 1, the portion of transient data relates to a range of data and corresponding states associated with the industrial automation environment.

3. The system of claim 1, further comprising a filter component that applies at least one of a format or a filter to the portion of transient data.

4. The system of claim 3, at least one of the format or the filter is one of the following: a high filter; a low filter; an exponential high filter; a low tripping filter; an average; a mean average; a range midpoint filter; a selective average; a user-defined mathematical operation; a mode; or a median.

5. The system of claim 1, the HMI component displays the transient data with more than one data state associated with the industrial automation environment.

6. The system of claim 1, further comprising a draw component that utilizes a snapshot at a first time and a second time to instantaneously capture data state associated with the first time and the second time.

7. The system of claim 6, the capture component accumulates a range of data and corresponding states between the first time and the second time, wherein the HMI component displays a portion of the range of data and corresponding states.

8. The system of claim 1, the capture component integrated within the HMI component includes a portion of transient capture logic.

9. The system of claim 1, the data received correlates to a physical device within the industrial automation environment.

10. The system of claim 9, the HMI component displays data associated with the physical device, the physical device is at least one of a computer, a disparate controller, a roller, a station, a welder, a scanner, a belt conveyor, a conveyor, a pump, a press, a fan, a furnace, a cooler, a valve, an electrical component, a drain, or a photo eye.

11. The system of claim 1, the data received corresponds to a device represented within the HMI component, the device is at least one of a light emitting diode (LED), a dial, an analog control, a bar graph, a graph, a push button, a gauge, a visual indicator, a slider, a light indicator, a numeric read out, a read out, a numeric input, an input, or a graphical icon.

12. The system of claim 1, the transient data is utilized by an entity within the industrial automation environment, the entity is at least one of a programmable logic controller (PLC), a physical device, an application, a portion of software, a disparate HMI, a disparate system, a portion of code, a program, a routine, a task, a component, a portion of code utilized by a controller, a module, an I/O module, a network, a drive, a motion axis, a drive, a trend, a structure, a tag, or an object.

13. The system of claim 1, further comprising a security component that provides authorization associated with the collection of transient data.

14. The system of claim 1, further comprising a log component that tracks transient data and respective data state related to the industrial automation environment.

15. The system of claim 1, further comprising a search component that facilitates querying data associated with the HMI component.

16. The system of claim 1, further comprising a bridge component that provides a first network protocol utilized to carry transient data from a programmable logic controller and configures the data for transmittal over a second network protocol.

17. The system of claim 16, the bridge component bridges multiple communication networks.

18. A method that facilitates utilizing a human machine interface (HMI), comprising:
employing a processor executing computer executable instructions stored on a computer-readable medium to implement the following acts:
receiving data associated with an environment;
collecting a range of data and respective data states between a snapshot cycle, wherein the snapshot cycle comprises a first snapshot and a second snapshot, each snapshot provides a single state of data within the industrial environment at one particular instance in time;
determining an average associated with the range of data and respective data states; and
providing a representation of the range of data and respective data states to a human machine interface (HMI) component at the time of the second snapshot, the representation is based at least in part on the average.

19. The method of claim 18, further comprising:
filtering the range of data and respective data states;
formatting the range of data and respective data states; and
displaying at least one of a filtered or a formatted range of data and respective states on a display component.

20. The method of claim 19, the display component is one of a computer monitor, a television, a plasma screen, a touchscreen, a portable digital assistant (PDA), an LCD, a mobile communication device, a messenger device, a flat-screen, a smartphone, a laptop, a machine, or a cellular phone.

21. A computer-implemented system that facilitates capturing data associated with an industrial automation environment, comprising:
- means for executing a computer instruction upon a processor;
- means for receiving data associated with an industrial automation environment;
- means for incorporating transient capture logic within a human machine interface (HMI) component;
- means for collecting a portion of transient data associated with the industrial automation environment, the transient data corresponds to data and respective data states collected in between a first snapshot and a second snapshot, each snapshot provides a single state of data within the industrial environment at one particular instance in time; and
- means for providing a representation of the portion of transient data to the HMI component at the time of the second snapshot, the representation comprises an average.

\* \* \* \* \*